Patented Sept. 12, 1939

2,173,052

UNITED STATES PATENT OFFICE 2,173,052

MONAZO DYES

Emmet F. Hitch and Swanie S. Rossander, Wilmington, Del., and Donovan E. Kvalnes, Penns Grove, N. J., assignors to E. I. du Pont de Nemours & Company, Wilmington, Del., a corporation of Delaware No Drawing. Application April 29, 1938,
Serial No. 204,996

13 Claims. (Cl. 260—205)

This invention relates to monazo dyes, and especially to monazo dyes in which one of the components is from a tertiary aryl amine having in its amino group an alkyl group and a polyhydroxy alkyl group. The polyhydroxy alkyl group has at least four carbon atoms and one less hydroxy group than carbons. The dyes of the invention are especially useful in the dyeing and printing of cellulose acetate and related fibres.

Heretofore benzene-azo-bis-dihydroxyethylaniline in which benzene is substituted by nitro or amino and benzene-azo-bis-dihydroxypropylaniline were known as soluble dyes for acetate silk but when the hydroxy alkyl radicals of these compounds contained four hydroxy groups the affinity of the compounds for cellulose acetate was found to be unsatisfactory. Other dyes heretofore used for dyeing acetate silk were insoluble or so nearly insoluble in water that it was necessary to pre-treat them to obtain a finely subdivided state of the dye and good dispersion thereof in the dyebath so that uneven dyeings could be avoided. In printing and often with dyeings made with such insoluble dyes, the printings and dyeings were speckled. Neither the soluble nor the insoluble dyes used heretofore had as satisfactory discharge properties as were desired; and many of the soluble dyes have not given dyeings on cellulose acetate which had satisfactory fastness to light and washing. It was therefore desirable to provide new water soluble dyes for cellulose esters and ethers which have good exhaust, discharge and fastness properties and will give level dyeings and printings.

It is among the objects of the invention to provide monazo dyes for cellulose esters, ethers and similar materials which have sufficient solubility in water to enable them to be readily applied to the goods by dyeing and by printing processes. Another object of the invention is to provide monazo dyes having the general formula

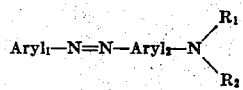

in which $R_1$ is an alkyl radical and $R_2$ is a polyhydroxy alkyl radical which contains at least four carbons and one less hydroxy group than carbons. Another object of the invention is to provide dyes having satisfactory exhaust and discharge properties. Another object of the invention is to provide dyes for cellulose esters and ethers having good fastness to light and washing. Still other objects of the invention will be apparent from the following description.

The objects of the invention may be attained in general by coupling a diazotized primary aryl amine to an N-alkyl, N-polyhydroxy alkyl, aryl amine in which the polyhydroxy group is a radical having at least four carbons and one less hydroxy group than carbons. Dyeings and printings with the dye may be made in general with solutions or printing compositions containing solutions of the dye.

The invention will be more fully set forth in the following more detailed description which includes examples that are given as illustrative embodiments of the invention and not as limitations thereof.

Example 1

168 parts of 5-nitro-2-amino anisol were suspended in 1000 parts of water and 290 parts of 31.5% hydrochloric acid. The mixture was cooled to 0–5° C. by adding ice and diazotized by adding 69 parts of sodium nitrite dissolved in 300 parts of water. The diazo solution was filtered. 271 parts of N-methyl, N-sorbityl aniline were dissolved in 2000 parts of water and 116 parts of 31.5% hydrochloric acid. The mixture was cooled to 5° C. by the addition of ice and the filtered diazo solution was added to the mixture. To complete the coupling the mineral acidity was destroyed by the adding of 350 parts of sodium acetate trihydrate dissolved in 750 parts of water. The mixture was made slightly alkaline to Brilliant Yellow paper by the adding dilute sodium hydroxide solution, and the dye was separated from the mixture by filtration. The water solution of the dye was red. A solution of the dye in hot water dyed cellulose acetate a heavy red shade of good fastness to light. The product is represented by the formula

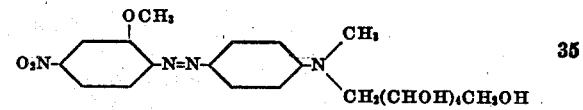

Example 2

172.5 parts of ortho chloro para nitro aniline were diazotized in the usual manner as indicated in the preceding example and filtered. 285 parts of N-methyl, N-sorbityl meta toluidine were dissolved in 2000 parts of water and 116 parts of 31.5% hydrochloric acid. The mixture was cooled to 5° C. by the addition of ice and the diazo solution was added slowly to the mixture. Coupling proceeded rapidly. The mixture was made slightly alkaline to Brilliant Yellow by the slow addition of dilute caustic, and the precipitate of dye was separated by filtration. A solution of the dye in water heated to 85° C. is bluish red in color and dyes cellulose acetate a heavy bright rubine shade of excellent fastness to light. The compound is represented by the formula

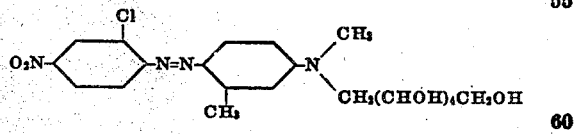

Example 3

69 parts of dry sodium nitrite were added during 30 minutes to 1450 parts of 100% sulfuric acid whilst keeping the temperature of the mixture below 25° C. by external cooling. The mixture was then stirred thirty minutes. 183 parts of 2.4-dinitroaniline were added to the mixture during 45 minutes. The latter mixture was stirred for one hour and a half during which time the temperature was allowed to rise to 30° C. The clear solution of diazo salt was poured onto 3000 parts of ice and 500 parts of water and then filtered. 315 parts of N-methyl N-sorbityl cresidine were dissolved in 2000 parts of water and 116 parts of 31.5% hydrochloric acid, and cooled to 0–5° C. by adding ice. The diazo solution was run slowly into the latter solution and then 1200 parts of sodium hydroxide dissolved in 2500 parts of water were added whilst the temperature was maintained below 10° C. by the addition of ice. The mixture was then made slightly alkaline to Brilliant Yellow paper by the addition of a little dilute sodium hydroxide solution and was filtered. The dye was washed with a little water and dried at 45° C. A solution of the dye in water warmed to 85° C. was violet in color and dyed cellulose acetate a heavy bluish-violet shade of good fastness to light. The product is represented by the formula

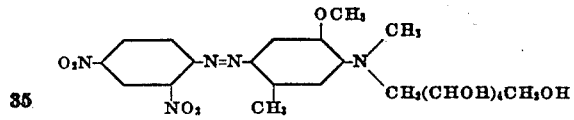

The following monazo dyes having the same general properties except as noted, were prepared by similar methods.

include monazo compounds represented generally by the formula

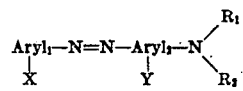

in which Aryl₁ and Aryl₂ are of the benzene and naphthalene series. Either or both aryl nuclei may be benzene or naphthalene. Either or both aryl nuclei may be unsubstituted or they may be substituted by other groups.

Among the substituents of Aryl₁ are nitro, halogen, alkyl, alkoxy, acylamino, hydroxy, carboxy and sulfonic acid, such as chloro, bromo, methyl, ethyl, propyl, butyl, longer chain alkyl groups, the corresponding alkoxy groups, acetylamino, longer chain alkacylamino groups and aroylamino groups, such as benzoylamino.

As many substituent groups as one less than the number of carbons in Aryl₁ may be present. Desirable variations can usually be obtained with no more than three substituent groups, but one or two substituent groups which are alike or unlike are highly satisfactory. Numerous diazo bases are specified in the examples but many others can be used.

Aryl₂ is a nucleus of the benzene or naphthalene series and may be unsubstituted or substituted by one or more groups up to 2 less than the number of carbons in Aryl₂ so long as the substituent groups do not interfere with the coupling with diazotized aryl amines. Satisfactory variations can ordinarily be obtained with one or two substituents in Aryl₂ but more can be present.

As representative substituents of Aryl₂ are mentioned halogen, hydroxy, alkyl, alkoxy and acylamino, such as those used for substituents in Aryl₁.

The symbol R₁ stands for an alkyl or substi-

| Example | | |
|---|---|---|
| 4 | Meta fluoro aniline ——→N-methyl, N-sorbityl aniline | Yellow. |
| 5 | Para amino acetanilide ——→N-methyl, N-sorbityl aniline | Do. |
| 6 | 2,5-dichlor aniline ——→N-methyl, N-sorbityl aniline | Do. |
| 7 | Ortho nitro aniline ——→N-methyl, N-sorbityl aniline | Orange. |
| 8 | Meta nitro aniline ——→N-methyl, N-sorbityl aniline | Do. |
| 9 | Para nitro aniline ——→N-methyl, N-sorbityl aniline | Scarlet. |
| 10 | Meta nitro-para toluidine ——→N-methyl, N-sorbityl aniline | Orange. |
| 11 | Ortho chlor-para nitro-aniline ——→N-methyl, N-sorbityl aniline | Red. |
| 12 | 4,6-dichlor-2-nitro aniline ——→N-methyl, N-sorbityl aniline | Scarlet. |
| 13 | 2,6-dichlor-4-nitro aniline ——→N-methyl, N-sorbityl aniline | Yellowish brown. |
| 14 | 2,5-dinitro aniline ——→N-methyl, N-sorbityl aniline | Bluish red. |
| 15 | Picramic acid (OH:NH₂:NO₂:NO₂, 1,2,4,6) ——→N-methyl, N-sorbityl aniline | Pink. |
| 16 | Metanilic acid ——→N-methyl, N-sorbityl aniline | Yellow. |
| 17 | 4-nitro-1-naphthylamine ——→M-methyl, N-sorbityl aniline | Rose. |
| 18 | Para chlor aniline ——→N-methyl, N-sorbityl m-toluidine | Yellow. |
| 19 | Para nitro aniline ——→N-methyl, N-sorbityl m-toluidine | Orange. |
| 20 | 4,6-dichlor-2-nitro aniline ——→N-methyl, N-sorbityl m-toluidine | Scarlet. |
| 21 | 2,6-dichlor-4-nitro aniline ——→N-methyl, N-sorbityl m-toluidine | Reddish brown. |
| 22 | 6-brom-2,4-dinitro aniline ——→N-methyl, N-sorbityl m-toluidine | Violet. |
| 23 | Metanilic acid ——→N-methyl, N-sorbityl m-toluidine | Yellow. |
| 24 | Para nitro aniline ——→N-methyl, N-sorbityl, ortho anisidine | Scarlet. |
| 25 | 5-nitro-2-amino anisol ——→N-methyl, N-sorbityl, ortho anisidine | Red. |
| 26 | Aniline ——→N-methyl, N-sorbityl cresidine | Yellow. |
| 27 | Para chlor aniline ——→N-methyl, N-sorbityl cresidine | Do. |
| 28 | 2,5-dichlor aniline ——→N-methyl, N-sorbityl cresidine | Do. |
| 29 | Para nitro aniline ——→N-methyl, N-sorbityl cresidine | Red. |
| 30 | 5-nitro-2-amino anisol ——→N-methyl, N-sorbityl cresidine | Bluish red. |
| 31 | 4,6-dichlor-2-nitro aniline ——→N-methyl, N-sorbityl, cresidine | Scarlet. |
| 32 | 2,6-dichlor-4-nitro aniline ——→N-methyl, N-sorbityl, cresidine | Reddish brown. |
| 33 | Picramic acid ——→N-methyl, N-sorbityl, cresidine | Red. |
| 34 | 6-brom-2,4-dinitro aniline ——→N-methyl, N-sorbityl cresidine | Reddish blue. |
| 35 | Para nitro aniline ——→N-methyl, N-sorbityl 2,5-dimethoxy aniline | Red. |
| 36 | 2,4-dinitro aniline ——→N-methyl, N-sorbityl 2,5-dimethoxy aniline | Violet. |
| 37 | P-nitro-aniline ——→N-sorbityl, N-benzyl m-toluidine | Red. |
| 38 | M-nitro-aniline ——→N-sorbityl, N-benzyl m-toluidine | Reddish yellow. |
| 39 | Aniline ——→N-methyl, N-sorbityl alpha-naphthylamine | Do. |
| 40 | Para nitro aniline ——→N-methyl, N-sorbityl alpha-naphthylamine | Reddish orange. |
| 41 | 5-nitro-2-amino anisol ——→N-methyl, N-sorbityl alpha-naphthylamine | Bluish red. |
| 42 | Para nitro aniline ——→N-hydroxy ethyl, N-sorbityl-m-toluidine | Red. |
| 43 | Para nitro aniline ——→(N-sorbityl aniline condensed with several moles of ethylene oxide) | Scarlet. |
| 44 | 6-brom-2,4-dinitro aniline ——→(N-sorbityl cresidine condensed with three moles of ethylene oxide) | Bluish violet. |
| 45 | Para nitro aniline ——→N-sorbityl, -N-carbethoxy methyl aniline | Scarlet. |
| 46 | Para nitro aniline ——→N-sorbityl, N-carboxy methyl aniline | Do. |

The compounds of the invention are not restricted to those specified in the examples. They include monazo compounds represented generally by the formula tuted alkyl group, such as methyl, ethyl, propyl, butyl, longer chain alkyl and substituted derivatives of such alkyl. As representative of substituted alkyl groups are mentioned hydroxy alkyl groups, such as hydroxy ethyl, hydroxy propyl, dihydroxy propyl, beta-hydroxy-gamma-chloro-propyl, beta-hydroxy-gamma-methoxy-propyl and even longer chain alkyls substituted once or more by hydroxy which may also contain other substituent groups. The substituted alkyl group may be aralkyl, such as methyl-, ethyl- or a higher alkyl-phenyl group; polyethenoxy, such as the group —(CH$_2$CH$_2$O)$_n$CH$_2$CHOH where $n$ is 1 or more; carboxy alkyl, such as carboxy methyl, carboxy ethyl, longer chain alkyl groups of the type —(CH$_2$)$_n$—COOH, and alkyl esters of these groups, such as methyl and ethyl, where $n$ is 1 or 2; sulfato alkyl groups of the type —(CH$_2$)$_n$O—SO$_3$H where $n$ is 1 or 2 and many other groups of the type mentioned.

The symbol R$_2$ stands for a polyhydroxy alkyl group having four to six carbon atoms and one less hydroxy group than carbons. The polyhydroxy alkyl group may be connected to the amino nitrogen through the carbon of an end group such as a —CH$_2$ group or a —CHOH group, or through the carbon of an intermediate group such as a —CH group. Types of polyhydroxy alkyl groups are —CH$_2$(CHOH)$_n$—CH$_2$OH CH$_2$(CHOH)$_n$—CH—CH$_2$OH and CH$_3$—CH—(CHOH)$_n$—CH$_2$OH $n$ being an integer such that there are at least four carbons in the group. As examples of polyhydroxy alkyl groups are mentioned the radical of the alcohol sorbitol and the radical of reduced monosaccharides, such as erythrose, glucose, arabinose and still other radicals of monosaccharides having the required number of carbon and hydroxy radicals. It is to be understood that the radicals of other compounds besides those specifically mentioned can be used, such as the radical of pentaerythrythol, C(CH$_2$OH)$_4$.

As convenient methods of preparing the tertiary amines used in accordance with the invention the following are mentioned but other methods can be used. In general, it is convenient to form a secondary aryl amine of the type Aryl-NH-polyhydroxyalkyl and then form the tertiary aryl amine by alkylation. For example, a secondary arylamine may be formed by catalytically hydrogenating a solution containing a polyhydroxy alkyl compound having the desired polyhydroxy radical and a substituted or unsubstituted primary aryl amine having an open position such that coupling can be made eventually to a diazotized aryl amine, the hydrogenation being carried out in the presence of a metallic hydrogenation catalyst, such as nickel or cobalt and at elevated temperatures and pressures, such as at 100° C. and 800 pounds pressure.

The secondary amine can also be prepared by reacting a suitable halohydrin and the primary aryl amine by methods well known to the art, such as reacting a primary aryl amine and mannitol chlorhydrin, or a primary aryl amine and the chlorhydrin of pentaerythritol. The tertiary aryl amine can be formed by alkylating the secondary amine with an appropriate alkyl or substituted alkyl compound. As examples of alkylations, the following are mentioned together with compounds which may be used for this purpose:

| Reagent | Alkyl group introduced |
|---|---|
| (CH$_3$)$_2$SO$_4$ | CH$_3$. |
| (C$_2$H$_5$)$_2$SO$_4$ | C$_2$H$_5$. |
| C$_4$H$_9$Br | C$_4$H$_9$. |
| pCH$_3$—C$_6$H$_4$SO$_2$C$_2$H$_5$ | C$_2$H$_5$. |
| ClCH$_2$CH$_2$OH | CH$_2$CH$_2$OH. |
| ClCH$_2$CHOHCH$_2$OH | CH$_2$CHOHCH$_2$OH. |
| ClCH$_2$—CH——CH$_2$  | CH$_2$CHOH—CH$_2$Cl. |
| CH$_2$——CH$_2$ 1 mol 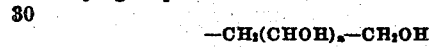 | CH$_2$CH$_2$OH. |
| CH$_2$——CH$_2$ 3 mols 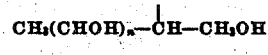 | CH$_2$CH$_2$O—CH$_2$CH$_2$O—CH$_2$CH$_2$OH (or partially reacted with the hydroxyl groups of the sorbityl group). |
| ClCH$_2$—COOH 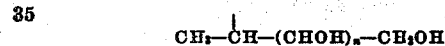 | CH$_2$COOH (Cf. Helv. Chim. Acta. vol. 20, page 90 (1937)). |
| ClCH$_2$COOC$_2$H$_5$ | CH$_2$COOC$_2$H$_5$. |
| ClCH$_2$CH$_2$OC$_2$H$_5$ | CH$_2$CH$_2$OC$_2$H$_5$. |

As illustrative of suitable procedures for dyeing the following is mentioned. A dyebath was made by dissolving 0.25 part of the dye described in Example I in 2000 parts of water. The bath was heated to 85° C. and a skein consisting of 50 parts of cellulose acetate silk was entered in the solution. The dye bath was maintained at 85° C. during the dyeing. The dyeing was completed in 45 minutes. After rinsing and squeezing to remove the dyebath and excess water, the skein was dried. The cellulose acetate was dyed a heavy red shade having good fastness to light and washing. The bath was well exhausted. The dyeing was an even shade and it had good discharge properties.

In general, dyeings are made by dissolving the dyes in water and entering the material to be dyed into the heated solution. A temperature of about 85° C. is generally preferred but higher and lower temperatures can be used. For satisfactory results the temperatures may be about the same as those used for dyeing with insoluble dyes, namely about 75° C. to about 90° C. At optimum temperatures the rate of absorption of the dyes used in accordance with this invention is more rapid than with dispersed insoluble dyes, and a stronger dyeing is obtained at relatively low temperatures than with dyes which require fine dispersion. The presence of dye in excess of that which goes into solution can be used with success when the undissolved dye is dispersed in the solution as by the action of a dispersing agent. The dyes of the invention are more easily dispersed than the insoluble dyes of the prior art. In making prints similar solutions of the dyes are mixed with the printing vehicle, the fabric is then printed and finally steamed.

The dyes of the invention give level dyeings of unusual deep shade and of excellent fastness to light on cellulose esters and ethers. Being soluble, no pretreatment to obtain finely divided particles and dispersion in the dyebath to prevent uneven dyeings is necessary. Good prints which are free from a specky appearance are obtainable with ease. The compounds are soluble in hot water and can be used for piece dyeing as well as for printing. Although soluble in hot water, the dyes have the peculiar property of having excellent fastness to washing, the fastness to washing being at least equal to the insoluble cellulose acetate dyes. The dyes discharge well and they are fast to light. They may be dyed with or without the presence of salt and consequently can be used in admixture with dispersed dyes or with dyes which require salt for exhaustion.

Since from the foregoing description of the invention it will be apparent to those skilled in the art that various other embodiments of the invention may be made without departing from the spirit and scope thereof, it is to be understood that the invention is not restricted to the illustrative embodiments which are specifically set forth.

We claim:

1. A monazo compound in which one member is the radical of the benzene and naphthalene series; a second member is the radical of a tertiary aryl amine in which the aryl nucleus is from the benzene and naphthalene series and the amino nitrogen is connected to an alkyl group and a polyhydroxyalkyl group, said polyhydroxyalkyl group having four to six carbon atoms and one less hydroxy group than carbons; and an azo bridge para to the tertiary amino group connecting said members.

2. A monazo compound in which one member is the radical of the benzene and naphthalene series; a second member is the radical of a tertiary aryl amine in which the aryl nucleus is from the benzene and naphthalene series and the amino nitrogen is connected to an alkyl group and a polyhydroxyalkyl group, said polyhydroxyalkyl group having six carbon atoms and one less hydroxy group than carbons; and an azo bridge para to the tertiary amino group connecting said members.

3. A monazo compound in which one member is the radical of the benzene series; a second member is the radical of a tertiary phenyl amine in which the amino nitrogen is connected to an alkyl group and a polyhydroxyalkyl group, said polyhydroxyalkyl group having four to six carbon atoms and one less hydroxy group than carbons; and an azo bridge para to the tertiary amino group connecting said members.

4. A monazo compound represented by the formula

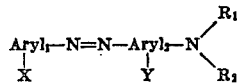

in which Aryl$_1$ and Aryl$_2$ are each nuclei of compounds of a group consisting of benzene and naphthalene compounds, X is at least one of a group consisting of hydrogen, nitro, halogen, alkyl, alkoxy, acylamino, hydroxy, carboxy and sulfonic acid, Y is at least one of a group consisting of hydrogen, halogen, hydroxy, alkyl, alkoxy and acylamino, R$_1$ is a radical of a group consisting of alkyl hydroxyalkyl, hydroxy chloro alkyl, hydroxy methoxy alkyl and aralkyl; and R$_2$ is a polyhydroxyalkyl radical having four to six carbon atoms and one less hydroxy group than carbons.

5. A monazo compound represented by the formula

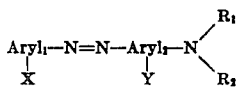

in which Aryl$_1$ and Aryl$_2$ are nuclei of benzene compounds; X is at least one of a group consisting of hydrogen, nitro, halogen, alkyl, alkoxy, acylamino, hydroxy, carboxy and sulfonic acid; Y is at least one of a group consisting of hydrogen, halogen, hydroxy, alkyl, alkoxy and acylamino; R$_1$ is the radical of a group consisting of alkyl, hydroxyalkyl, hydroxy chloro alkyl, hydroxy methoxy alkyl; and aralkyl; and R$_2$ is a polyhydroxyalkyl radical having four to six carbon atoms and one less hydroxy group than carbons.

6. A compound represented by the formula

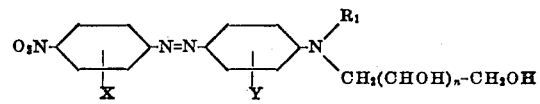

in which X is at least one of a group consisting of hydrogen, nitro, halogen, alkyl, alkoxy, acylamino, hydroxy, carboxy and sulfonic acid; Y is at least one of a group consisting of hydrogen, halogen, hydroxy, alkyl, alkoxy and acylamino; hydroxyalkyl, hydroxy chloro alkyl, hydroxy methoxy alkyl and aralkyl; and $n$ is 1 to 4.

7. A compound represented by the formula

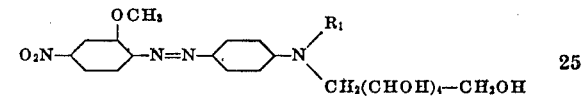

in which R$_1$ is a radical of a group consisting of alkyl, hydroxyalkyl, hydroxy chloro alkyl, hydroxy methoxy alkyl and aralkyl.

8. A compound represented by the formula

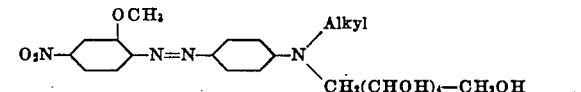

9. A compound represented by the formula

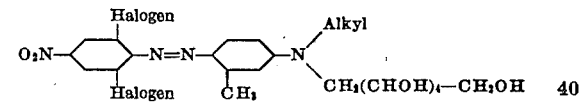

10. A compound represented by the formula

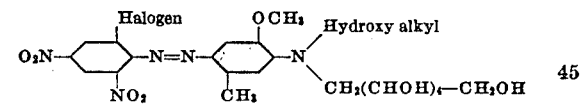

11. The compound represented by the formula

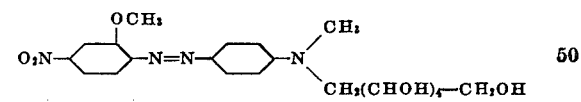

12. The compound represented by the formula

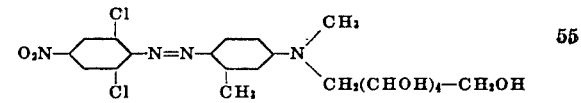

13. The compound represented by the formula

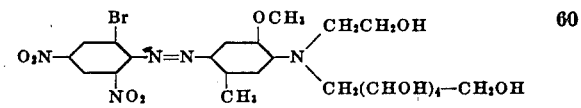

EMMET F. HITCH.
SWANIE S. ROSSANDER.
DONOVAN E. KVALNES.

CERTIFICATE OF CORRECTION.

Patent No. 2,173,052. September 12, 1939.

EMMET F. HITCH, ET AL.

It is hereby certified that error appears in the printed specification of the above numbered patent requiring correction as follows: Page 4, second column, line 19, claim 6, after the word and semicolon "acylamino;" insert $R_1$ is the radical of a group consisting of alkyl; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.